United States Patent
Ramesh et al.

(10) Patent No.: US 12,394,298 B2
(45) Date of Patent: *Aug. 19, 2025

(54) DYNAMIC COLLECTION AND REPORTING OF CUSTOMER PREMISES CONTEXT INFORMATION IN RESPONSE TO PREDICTED EMERGENCY EVENT

(71) Applicant: Roku, Inc., San Jose, CA (US)

(72) Inventors: Sunil Ramesh, Cupertino, CA (US); Charles Brian Pinkerton, Boulder, CO (US); Mark Robins, San Jose, CA (US); Anthony Wood, San Jose, CA (US)

(73) Assignee: Roku, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/664,758

(22) Filed: May 15, 2024

(65) Prior Publication Data
US 2024/0296730 A1    Sep. 5, 2024

Related U.S. Application Data

(63) Continuation of application No. 18/365,407, filed on Aug. 4, 2023, now Pat. No. 12,014,615, which is a continuation of application No. 17/860,649, filed on Jul. 8, 2022, now Pat. No. 11,763,656.

(51) Int. Cl.
*G08B 21/10* (2006.01)
*H04L 12/28* (2006.01)

(52) U.S. Cl.
CPC .......... *G08B 21/10* (2013.01); *H04L 12/2825* (2013.01); *H04L 12/2834* (2013.01)

(58) Field of Classification Search
CPC ..... G08B 21/10; G08B 31/00; H04L 12/2825; H04L 12/2834; H04L 12/282
See application file for complete search history.

(56) References Cited

U.S. PATENT DOCUMENTS

| 10,051,349 B2 * | 8/2018 | Schattmaier .......... G08B 25/10 |
| 10,482,757 B1 | 11/2019 | Shryer et al. |
| 11,109,194 B1 | 8/2021 | Pinheiro |
| 2008/0258880 A1 | 10/2008 | Smith |

(Continued)

*Primary Examiner* — Quan Zhen Wang
*Assistant Examiner* — Rajsheed O Black-Childress
(74) *Attorney, Agent, or Firm* — McDonnell Boehnen Hulbert & Berghoff LLP

(57) ABSTRACT

A method and system for collecting context information in response to prediction of an emergency event. A cloud-based computing system could determine that an emergency event is predicted to impact a customer premises at an upcoming time. Responsive to that determination, and before the upcoming time, the cloud-based computing system could then cause or more on-premises computing devices at the customer premises to collect and report context information, such as a count of people present at the customer premises and/or an operational state of one or more utilities or other systems at the customer premises, that may assist in responding to the emergency event. Further, the cloud-based computing system could select a given such device at the customer premises to function as a coordinating device to work with one or more other devices at the customer premises to collect and report the context information.

20 Claims, 7 Drawing Sheets

(56) References Cited

U.S. PATENT DOCUMENTS

| | | |
|---|---|---|
| 2016/0093191 A1 | 3/2016 | Bloom |
| 2016/0173963 A1* | 6/2016 | Filson .................... G08B 21/10 340/870.09 |
| 2017/0289650 A1* | 10/2017 | Schattmaier ........... G06N 5/046 |
| 2018/0053401 A1 | 2/2018 | Martin |
| 2018/0317076 A1 | 11/2018 | Best et al. |
| 2019/0187643 A1* | 6/2019 | Carpenter ............... H04W 4/38 |
| 2020/0090492 A1* | 3/2020 | Flaster ................... G08B 17/10 |
| 2024/0013653 A1 | 1/2024 | Levitian |

\* cited by examiner

DYNAMIC COLLECTION AND REPORTING OF CUSTOMER PREMISES CONTEXT INFORMATION IN RESPONSE TO PREDICTED EMERGENCY EVENT

REFERENCE TO RELATED APPLICATION

This is a continuation of U.S. patent application Ser. No. 18/365,407, filed Aug. 4, 2023, which is a continuation of U.S. patent application Ser. No. 17/860,649, filed Jul. 8, 2022, the entirety of each of which is hereby incorporated by reference.

SUMMARY

Modern customer premises, such as homes, hotels, or offices, are increasingly equipped with many devices that are configured to engage in internet communications. These devices may range from traditional internet-connected equipment such as personal computers, telephone systems, security systems, gaming systems, and over-the-top (OTT) streaming media players, to newer "Internet of Things (IoT)" equipment including "smart home" devices such as connected appliances, utilities, lights, switches, power outlets, and speakers, as well as wearable devices such as watches and/or health monitors, among countless other examples.

A typical customer premises would have a wide area network (WAN) connection with the internet as well as a local area network (LAN) through which on-premises devices such as those noted above could engage in internet communication over the WAN connection. For instance, the customer premises could be equipped with a cable, satellite, cellular, or other WAN modem configured to connect with an associated head end (e.g., cable or satellite head end or cellular core network) that would provide WAN internet connectivity, and the modem could include or be coupled with a router that would provide LAN connectivity for the on-premises devices, to allow the devices to engage in internet communications through the WAN connection.

With this arrangement, when the WAN modem is initially powered on, the WAN modem may register its presence with the head end, and the head end may assign to the modem a globally-routable Internet Protocol (IP) address, or the modem may have a statically-assigned globally-routable IP address. Further, as each on-premises devices is initially powered on and in communication with the router, the device may likewise register its presence with the router, and the router may assign to the device a locally-routable IP address, or the device may have a statically-assigned locally-routable IP address (local IP address). Each such on-premises device may then engage in internet communications through the router, modem, and WAN connection, with the router performing standard network address translation between the device's local IP address and the modem's global IP address.

In practice, the internet-connected devices at such customer premises may often engage in internet communication with remote network systems. For example, each of various OTT streaming media players at the customer premises may engage in internet communication with media servers operated by an OTT provider (e.g., virtual multichannel video programming distributor (virtual MVPD)), a security system at the customer premises may engage in internet communication with a central monitoring service, and IoT devices may engage in internet communication with various associated service providers, among numerous other possibilities.

The present disclosure provides for leveraging the connected nature of such customer premises to help assist in responding to an emergency event at the customer premises. More particularly, the disclosure provides for responding to prediction of an emergency event by dynamically provisioning and causing equipment at customer premises to collect and report context information that may help to facilitate emergency response.

In accordance with the disclosure, a cloud-based prediction system could predict that a given customer premises will be impacted by an emergency event, such as a significant weather and/or natural-disaster event, at an upcoming time. In response to the prediction and before the upcoming time, the cloud-based prediction system could then signal to equipment at the customer premises to cause the equipment to collect and report context information, such as a count of people at the customer premises and/or a status of various utilities and/or other systems at the customer premises.

The cloud-based prediction system could predict that the customer premises will be impacted by the emergency event in various ways. To begin with, the cloud-based system could learn of the upcoming emergency, perhaps by regularly polling or subscribing to be notified by emergency alert services such as the National Weather Service for instance, which could inform the cloud-based system of an area and/or location trajectory of the upcoming emergency event, possibly encompassing a location of the customer premises.

Further, to predict that the upcoming emergency will impact the customer premises, the cloud-based system could use crowd-sourcing, taking into account records that the emergency event has already impacted various other customer premises in the area, possibly along a location trajectory headed toward the location of the customer premises.

Without limitation, one form of impact of the emergency event may be loss of internet connectivity at or around the time of the emergency event. Thus, if the cloud-based system is in regular internet communication with at least one device in each of various customer premises in the area, the cloud-based system could determine that that communication with some number of customer premises in the area has been lost at or around the predicted time of the emergency, possibly on a rolling basis moving toward the location of the customer premises at issue, and the cloud-based system could conclude from that information that the customer premises at issue is also likely to lose its internet connectivity as a result of the predicted emergency event. Other forms of emergency impact and predictions of impact could be possible as well.

In response to predicting that the customer premises will be impacted by the upcoming emergency event, the cloud-based system could then dynamically provision equipment at the customer premises to collect and report context information that may help to facilitate emergency response.

By way of example, the cloud-based system could signal to the equipment at the customer premises to cause the equipment to determine and report on-premises context information determined before, during, and/or after the emergency impact. This context information could include, for instance, the number of people present at the customer premises (e.g., per floor, room, or other area within the customer premises, perhaps along with per-person demographic information) and/or the status of various utilities and/or other systems at the customer premises. Proactively provisioning the customer premises equipment (before the emergency impact) to collect and report such information before, during, and/or after emergency impact may help to facilitate emergency response. For instance, if the equipment reports after the emergency impact that there are a certain number of people at the customer premises, emergency responders may use that information as a basis to rescue or otherwise assist those people. Further, if the equipment system reports pre-impact context information and post-impact context information, then emergency responders may be able to assist given knowledge of the change in context possibly resulting from the emergency impact.

In an example implementation, if there are multiple internet-connected devices at the customer premises, the cloud-based system could select a particular one of those devices to coordinate this collecting and reporting. For instance, in response to predicting that the customer premises will be impacted by the emergency event, the cloud-based system could select a given one of the devices to be the coordinating device based on the device having the most memory and/or processing power of the various connected devices at the customer premises. The cloud-based system could then signal to that coordinating device, providing the device with a request for the context information as noted above and with other information and/or logic to enable the device to do so, and the device could then respond accordingly. The coordinating device may then collect some of the requested information itself, using various sensors or the like, and/or the coordinating device may engage in signaling with one or more other devices at the customer premises to cause the one or more other devices to collect some of the requested information and to provide the coordinating device with the information. And the coordinating device may then the report the collected information to the cloud-based system or other entity to help facilitate emergency response.

As a practical example of this process, the cloud-based system may predict that an earthquake, hurricane, fire, or other natural disaster will occur at the location of the customer premises. Further, the cloud-based system may determine based on records of lost communication with one or more other customer premises in the area that the customer premises at issue will soon lose its internet connectivity. In response, the cloud-based system may then select a coordinating device at the customer premises and provision that device to collect and report counts of the number of people present at the customer premises both before and after the predicted natural-disaster impact. The coordinating device may then work with one or more other devices at the customer premises to collect the context information before the predicted impact and may store that information. Further, the coordinating device may also store logic that causes the coordinating device to similarly collect the context information after the predicted impact-such as after a loss and restoration of internet connectivity and/or after a loss and restoration of power. And the coordinating device may then report this context information to the cloud-based system or other entity to help facilitate emergency response.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
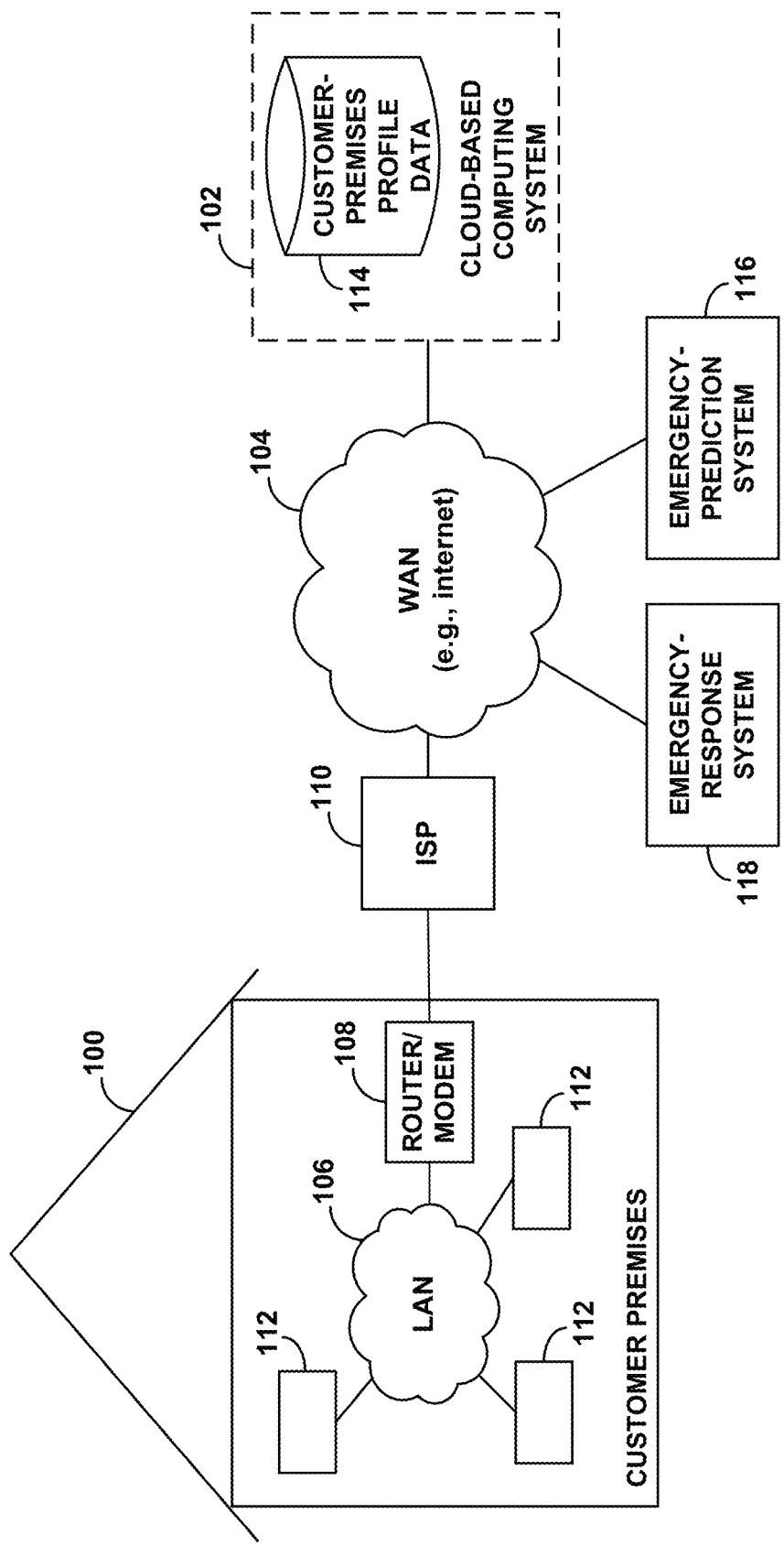
FIG. 1 is a simplified block diagram of an example system in which disclosed features can be implemented.

Referring to the drawings, as noted above, FIG. 1 is a simplified block diagram of an example system in which the various disclosed features could be implemented. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes a representative customer premises 100 and a cloud-based computing system 102, communicatively linked together by a WAN 104 such as the internet.

In particular, the example customer premises is shown including a LAN 106 having a router/modem 108 in communication with an ISP 110 that provides connectivity with the WAN 104, and the cloud-based computing system 102 is shown sitting as a node on or otherwise accessible via the WAN 104. Further, shown sitting as nodes on the LAN 106 at the customer premises 100 are a number of on-premises computing devices 112.

As noted above, with this arrangement, the ISP 110 could assign to the router/modem 108 and thus to the customer premises 100 a global IP address routable on the WAN 104, and the router/modem 108 could assign respectively to each of the various on-premises computing devices 112 a local IP address routable on the LAN 106. Further, the cloud-based computing system 102 could also have a global IP address routable on the WAN 104. Thus, the various on-premises computing devices 112 may engage in network communication with the cloud-based computing system 102, with packet traffic flowing via the router/modem 108, the ISP 110, and the WAN 104, and with the router/modem 108 performing network address translation between the devices' local IP addresses and the customer premises' assigned global IP address.

In an example implementation, the customer premises 100 could take any of various forms, examples of which include without limitation a home, an office, a hotel, a dorm, a section (e.g., floor, room, or wing) of such facilities, a combination of multiple such facilities (e.g., a multi-building campus or the like), or another place where one or more on-premises devices could operate as described herein.

Further, the on-premises computing devices 112 could take any of various forms as well, including but not limited to those noted above-such as personal computers, telephone system equipment, security system equipment, gaming system equipment, OTT streaming media players, smart home devices, and wearable devices.

Each one or more such on-premises computing devices 112 could be configured to carry out various device operations described herein. For instance, each device could include one or more processors (e.g., one or more microprocessors and/or specialized processors), non-transitory data storage (e.g., one or more volatile and/or non-volatile storage components such as magnetic, optical, or flash storage), and program instructions stored in the non-transitory data storage and executable by the one or more processors to carry out the disclosed device operations. Further, each of one or more such devices 112 could include communication circuitry such as a wired and/or wireless Ethernet module and associated software, to enable the device 112 to engage in communication on the LAN 106 and in turn with entities on the WAN 104 such as with the cloud-based computing system 102.

In addition, one or more of the on-premises computing devices 112 could be configured to operate alone or in combination with one or more other of the on-premises computing devices 112 to collect and report context information like that described above. For example, to facilitate determining how many people are actively present at the customer premises 100, one or more of the on-premises computing devices 112 could include or be in communication with one or more motion-sensors, cameras, and/or other technology to scan and/or monitor the environment within the customer-premises using various known people-detection techniques to detect the presence of people and to determine the number of people actively present, such as the number of people moving at the customer premises. As another example, to facilitate determining the operational state of one or more utilities at the customer premises, one or more of the on-premises computing devices 112 could include or be in communication with one or more utility sensors configured to sense and report that information. Other examples are possible as well.

Each of the one or more on-premises computing devices 112 could have a permanent or semi-permanent hardware address, such as a Media Access Control (MAC) address, that uniquely identifies the device 112 on the LAN 106, and the router/modem 108 could store a mapping between each device's assigned local IP address and the device's unique hardware address. With this arrangement, a given such device 112 that knows the hardware address of another such device 112 may be able to determine the local IP address of that other device 112 by sending to the router/modem 108 a standard address-resolution-protocol (ARP) query and receiving a response that specifies the local IP address associated with the other device's hardware address.

Further, each of the devices 112 may have an associated set of capabilities data that defines various configuration and capabilities of the device, such as the device's data storage capacity and processing speed and whether the device is capable of determining and reporting context information such as that noted above, as well as what type of such context information the device is capable of determining and reporting, for instance. This capabilities data per device could be stored in data storage of the device at the time of manufacture of the device and/or at another time. Further or alternatively, the capabilities data per device could be stored in the cloud-based computing system 102 in association with the device's hardware address, among other possibilities.

The cloud-based computing system 102 could in turn comprise one or more servers and/or other computing platforms configured to interact with one or more of the on-premises computing devices 112 at least to facilitate the presently disclosed operations.

In a non-limiting example, the cloud-based computing system 102 could be provided and operated by a company that also provides various ones of the on-premises computing devices 112 and/or that provides software or other logic executable by those devices 112, to facilitate communication between those devices and the cloud-based computing system as presently contemplated.

For example, the cloud-based computing system 102 may be operated by an OTT provider, and the on-premises computing devices 112 may include one or more OTT streaming media players provided by that OTT provider and/or one or more smart-home and/or IoT devices provided by that OTT provider, and/or may be programmed or otherwise equipped with logic provided by that OTT provider to facilitates interaction between those devices and the OTT provider. As another example, the cloud-based computing system 102 may be operated by a security-system provider, and one or more of the on-premises computing devices 112 may be security system components provided by that security-system provider and/or other devices equipped with logic provided by that security-system provider.

The cloud-based computing system 102 could include one or more microprocessors and/or specialized processors), non-transitory data storage (e.g., one or more volatile and/or non-volatile storage components such as magnetic, optical, or flash storage), and program instructions stored in the non-transitory data storage and executable by the one or more processors to carry out various disclosed cloud-based computing system operations. Further, the cloud-based computing system 102 could include communication circuitry, such as a wired and/or wireless Ethernet module, and associated software that enables the cloud-based computing system 102 to engage in communication on the WAN 104 and in turn with devices 112 at the customer premises 100.

The cloud-based computing system 102 may have a static IP address and/or may be accessible at a defined WAN domain, such as at a defined universal resource locator (URL) address for instance. And each of the on-premises computing devices 112 may be pre-provisioned with that address information to facilitate initiating communication with the cloud-based computing system 102.

As further shown in FIG. 1, the cloud-based computing system 102 may store or otherwise have access to customer-premises profile data 114. This customer-premises profile data 114 could include a variety of information about customer premises 100. For instance, the profile data 114 could include a street address and/or other geographic location of the customer premises 100, an identification of each of the one or more on-premises computing devices 112 at the customer premises 100, and capabilities data for each such on-premises computing device 112.

The cloud-based computing system 102 could accumulate some or all of this profile data based on registration signaling from the on-premises computing devices 112 or in any of a variety of other ways.

For instance, as each on-premises computing device 112 powers on and obtains network connectivity, the device 112 may transmit to the address of the cloud-based computing system 102 a registration request that carries various data regarding the device 112, such as the device's unique hardware address, the device's local IP address, and the device's capabilities data. This request would flow over the WAN 104 as packet data designating the global IP address of the customer premises 100 as the source IP address and the global IP address of the cloud-based computing system 102 as the destination IP address.

Upon receipt of this request, the cloud-based computing system 102 could thus extract from the request and store a record of the on-premises computing device's identity (e.g., hardware address) and capabilities data. Further, the cloud-based computing system 102 could perform a standard lookup keyed to the source IP address to determine the physical street address or other geographic location where the on-premises computing device 112 is located and could record that address/location in association with the identified on-premises computing device 112. Alternatively, the cloud-based computing system could determine the physical address of the on-premises computing device in other ways, such as based on WiFi service set identifiers (SSIDs) detected and reported by the on-premises computing device 112, among other possibilities, and could likewise store that data.

For each of multiple such on-premises computing devices 112 located at the same customer premises 100, the cloud-based computing system 102 could thereby associate the devices 112 with each other based on their having the same associated customer-premises address/location. Therefore, the cloud-based computing system could establish as the customer-premises profile data 114 for a given such customer premises 100 a set of data that identifies one or more such on-premises computing devices 112 located at that customer premises, along with the hardware address and capabilities data respectively of each such device 112.

In an example implementation, each such on-premises computing device 112 may also be in regular communication with the cloud-based computing system 102.

For example, each such device 112 may be configured to periodically transmit to the cloud-based computing system 102 a heartbeat message such as a predefined message that the cloud-based computing system 102 is configured to treat as an indication that the device 112 is actively online. This heartbeat message could be a hypertext transfer protocol (HTTP) message or the like to which the cloud-based computing system 102 may be configured to respond with a response message that the device 112 is in turn configured to treat as an indication that it is actively in communication with the cloud-based computing system 102 and that may also carry other useful information from the cloud-based computing system 102 to the device 112.

Alternatively or additionally, each such device 112 may engage in signaling with the cloud-based computing system 102 to establish a transmission control port (TCP) socket defining an open communication channel between the device 112 and the cloud-based computing system 102, and the device 112 and cloud-based computing system may take steps to maintain that TCP socket, to facilitate quick communication between the device 112 and cloud-based computing system 102 when desired.

As further shown in FIG. 1, also sitting as a node on or otherwise accessible via the WAN 104 is an emergency prediction system 116. This emergency prediction system 116 could comprise any system that is capable of predicting and/or reporting prediction of an approaching emergency event, such as a significant weather and/or natural-disaster, or another emergency event whether or not nature related.

Without limitation, an emergency event could be a situation that poses an immediate risk to health, life, safety, property or environment and may require urgent assistance to help prevent further illness, injury, death, or other worsening of the situation. For instance, the emergency event may be an earthquake, typhoon, or hurricane. Thus, the emergency prediction system 116 may be a computing system provided by a government entity, such as the United States Geological Survey (USGS) or the National Weather Service (NWS), among other possibilities. Such a system 116 may work autonomously and/or with human input to regularly monitor for and predict when and where emergency events will occur (e.g., when an emergency event is predicted to start at a location or move to a location) and perhaps how long such emergency events are predicted to last per location.

In an example implementation, the cloud-based computing system 102 could subscribe to the emergency prediction system 116 to be notified by the emergency prediction system 116 of predicted emergency events. When the emergency prediction system 116 predicts that an emergency event will occur at a particular location/area, the emergency prediction system 116 may then automatically transmit a notification message via WAN 104 to the cloud-based computing system 102, informing the cloud-based computing system of the predicted emergency event, the geographic location where the emergency event is predicted to occur, a time of day when the emergency event is predicted to occur at that location, and perhaps how long the emergency event is predicted to last at that location.

As presently contemplated, when the cloud-based computing system 102 receives such a notification message from the emergency prediction system 116, the cloud-based computing system 102 could read the notification message to determine the predicted location and time of the emergency event, and the cloud-based computing system 102 could then refer to the customer-premises profile data 114 to identify customer premises 100 as customer premises where the emergency event is predicted to occur. For instance, the cloud-based computing system could compare the location of the customer premises 100 indicated by the customer-premises profile data with the predicted location of the emergency event indicated by the notification message from the emergency predication system 116 and, upon or in response to finding that those locations overlap or are within a predetermined short distance of each other, could conclude that the emergency is predicted to occur at and thus impact the location of the customer premises 100 at the predicted time.

In response to determining in this or another manner that an emergency event is predicted to occur at the location of the customer premises 100 at an upcoming predicted time, the cloud-based computing system 102 could then proceed as noted above, to cause one or more on-premises computing devices 112 at the customer premises 100 to collect and report context information that may assist in responding to the predicted emergency event.

By way of example, the cloud-based computing system 102 may responsively refer to the customer premises profile data 114 to determine the identity and capabilities of each of one or more on-premises computing devices 112 at the customer premises 100 and may then transmit to each of one or more such devices 112 one or more messages to which the device 112 is configured to respond by collecting and reporting such context information. Further, this could be based on a subscription model, where, through user input or other means, an on-premises computing device 112 subscribes to the cloud-based computing system 102 to participate in this process for certain types of emergency events or for emergency events generally. For instance, the registration messaging noted above could establish this subscription. Thus, the cloud-based computing system 102 may transmit the one or more messages to an on-premises computing device 112 based on the device 112 being at the customer premises 100 at issue and having subscribed to participate in this process.

The cloud-based computing system 102 could transmit at least some such message(s) to each such device 112 before the predicted time of the emergency event. For instance, the cloud-based computing system 102 could determine the predicted time of the emergency event and could select a time to send the message(s) to the on-premises computing device(s) 112 based on the selected time being before the predicted time of the emergency event. Thus, each such on-premises computing device 112 could receive the message(s) before the predicted time of the emergency event. Further, the cloud-based computing system 102 could transmit one or more such messages to one or more such on-premises computing devices 112 after the predicted time of the emergency event.

The message(s) that the cloud-based computing system 102 sends to a given such on-premises computing device 112 could be interpretable by the device 112 to cause the device 112 to collect context information at one or more times, such as shortly before the predicted time of the emergency event, at or during the predicted time of the emergency event, and/or after the predicted time of the emergency event, and to responsively report the collected context information to the cloud-based computing system 102 or to another designated system/address. As noted above, having an on-premises computing device 112 report context information collected at multiple such times in relation to the time of the predicted emergency event may help in emergency response, particularly if the context information collected shortly before the emergency event differs from the context information collected shortly after the emergency event.

For instance, the cloud-based computing system 102 could specify in the message(s) to the device 112 one or more such times when the device 112 should collect the context information, in a manner to which the device 112 would respond accordingly by collecting the context information at each of the specified one or more times. Further, the cloud-based computing system 102 could specify in the message(s) one or more times when the device 112 should report the collected context information, with an associated indication of time(s)-collected. For instance, the cloud-based computing system 102 could specify in the message(s) that the device 112 is to report the collected context information upon collecting the information or as soon as possible after collecting the information.

In addition, the message(s) that the cloud-based computing system 102 sends to a given such on-premises computing device 112 could specify what context information the device 112 should collect and report. For instance, the cloud-based computing system 102 could specify in a manner interpretable by the device 112 that the device 112 should collect and report a count of people actively present at the customer premises 100, the operational state of one or more utilities at the customer premises, and/or other context information.

The cloud-based computing system 102 could refer to the capabilities data of the device 112 to determine what type(s) of context information the device 112 is capable of collecting and reporting and could request the device 112 to collect and report such context information, and the device 112 may responsively collect and report the indicated context information. Alternatively, the message(s) to the device 112 may more generally request collecting and reporting of context information, and the device 112 may responsively collect and report whatever context information the device 112 is capable of collecting and reporting.

Further, the message(s) that the cloud-based computing system 102 sends to a given such on-premises computing device 112 could specify where the device 112 is to report collected context information. For instance, the message(s) could specify that the device 112 is to responsively report the collected context information to the cloud-based computing system 102. Alternatively or additionally, the message(s) could specify an IP address, URL, or other address of an emergency-response system 118 (e.g., police, fire, or other first-responder system) to which the device 112 is to report the collected context information perhaps with an HTTP POST message or the like.

As noted above, one way that the cloud-based computing system 102 could cause an on-premises computing device 112 to collect and report context information is for the cloud-based computing system 102 to provision the on-premises computing device 112 with program instructions or the like executable by the device 112 to collect and report the context information. For instance, in a scenario where the device 112 is not already configured with program logic that is executable by the device 112 to collect and report the context information in response to one or more messages from the cloud-based computing system 102, the cloud-based computing system could include such executable logic (e.g., an applet, script, or other program logic) in one or more messages to the device 112. The device 112 could thus receive that logic from the cloud-based computing system 102 and could self-install and then execute the logic to proceed accordingly with collecting and reporting context information as requested.

Furthermore, as noted above, in an implementation where there are multiple on-premises computing devices 112 at the customer premises 100 where the emergency event is predicted to occur, the cloud-based computing system 102 may select one or more of the devices 112 to coordinate and/or carry out the collection and reporting of context information from the customer premises 100. The cloud-based computing system could select an on-premises computing device 112 for this purpose based on consideration of the capabilities data of the multiple on-premises computing devices 112 at the customer premises 100.

For example, if the cloud-based computing system 102 seeks collection and reporting of a particular type of context information, such as one of those noted above for instance, the cloud-based computing system could select one of the multiple devices 112 at the customer premises based on the capabilities data of that device 112 indicating that the device 112 is capable of collecting and reporting that particular type of context information.

As another example, the cloud-based computing system 102 could select one of the multiple devices 112 at the customer premises to coordinate the collection and reporting of context information, with the selection being based on one or more configuration properties of the device 112 as indicated by the device's capabilities data. For instance, the cloud-based computing system 102 could select one of the devices 112 to be the coordinating device based on the device's storage capacity, processor speed, power type (e.g., whether the device has a backup power source, etc.), by comparison with such configuration properties of one or more other of the multiple devices 112 at the customer premises 100. By way of example, the cloud-based computing system 102 could select a device 112 based on it having at least predefined threshold large data storage capacity and/or predefined threshold high processor speed, among other possibilities.

Once the cloud-based computing system 102 selects an on-premises computing device 112 to be the coordinating device, the cloud-based computing system 102 could provision that selected device 112 to be the coordinating device for collecting and reporting context information.

For instance, the cloud-based computing system 102 could transmit to that device 112 the one or more messages as discussed above, which could cause the device 112 to collect and report context information.

Further, through the one or more messages or otherwise, the cloud-based computing system 102 could provision the device 112 with information and/or logic that enables and causes the device 112 to coordinate collection of context information by multiple devices 112 at the customer premises 100 and to report that collected context information. For instance, the cloud-based computing system 102 could transmit to the coordinating device a list of one or more other on-premises computing devices 112 at the customer premises 100, to enable the coordinating device to engage in LAN communication with one or more such other devices 112, to request and receive context information from each such other device 112.

By way of example, the cloud-based computing system 102 could refer to the customer-premises profile data 114 to determine the unique hardware address and/or local IP address of each such other device 112 and the capabilities data of each such other device 112, and the cloud-based computing system 102 could then transmit to the coordinating device a list of each such other device 112 along with the other device's hardware address and/or local IP address and the other device's capabilities data. If the cloud-based computing system 102 specifies the hardware address of any given such other device 112, the coordinating device may then be able to translate that hardware address to a local IP address of the other device 112 by sending an ARP request to the router/modem 108 as noted above.

Upon receipt of this information and any associated logic from the cloud-based computing system 102, the coordinating device could then engage in local processing to collect context information from each such one or more other devices 112 at the customer premises 100, to facilitate reporting the context information. For example, the coordinating device could transmit via LAN 106 to the local IP address respectively of each such other device 112 a request for the other device to collect and report to the coordinating device context information at one or more designated times, also possibly provisioning the other device 112 with logic executable by the other device 112 to do so. Each such other device 112 could then responsively collect context information as requested and report that context information to the coordinating device, and the coordinating device could report that context information in turn as requested by the cloud-based computing system 102.

With the various processes described above, after the cloud-based computing system 102 requests one or more on-premises computing devices 112 to collect and report context information in view of a predicted emergency event at the location of the customer premises 100, there is a chance that the customer premises 100 would lose its WAN connectivity before the requested device(s) 112 can responsively report the context information as requested. This loss of WAN connectivity could be an impact of the emergency event. For instance, a severe weather and/or natural disaster event or other emergency event may disconnect the connection between the router/modem 108 and the ISP 110, or another such loss of WAN connectivity may occur.

Optimally even with this loss of WAN connectivity, the one or more on-premises computing devices 112 may still proceed to collect context information as requested, at the one or more times requested such as before, during, and/or after the predicted time of the emergency event. The device(s) 112 could then retain the collected context information until the WAN connectivity is restored. And in response to restoration of the WAN connectivity, the device(s) could then report he collected context information as requested.

In addition, after the cloud-based computing system 102 requests the one or more on-premises computing devices 112 to collect and report context information in view of the predicted emergency event, there is a chance that the customer premises 100 would lose power before the requested device(s) 112 can responsively report the context information as requested. This loss of power could also be an impact of the emergency event. For instance, a severe weather and/or natural disaster event or other emergency event may disconnect the customer premises' connection with a local electrical power grid.

If this happens, any battery-powered on-premises computing devices 112 may continue to process the request for collecting context information. Further, one or more such on-premises computing devices 112 may store their state in non-volatile memory and may continue to respond to the request after power to the customer premises 100 is restored.

Figure 2:
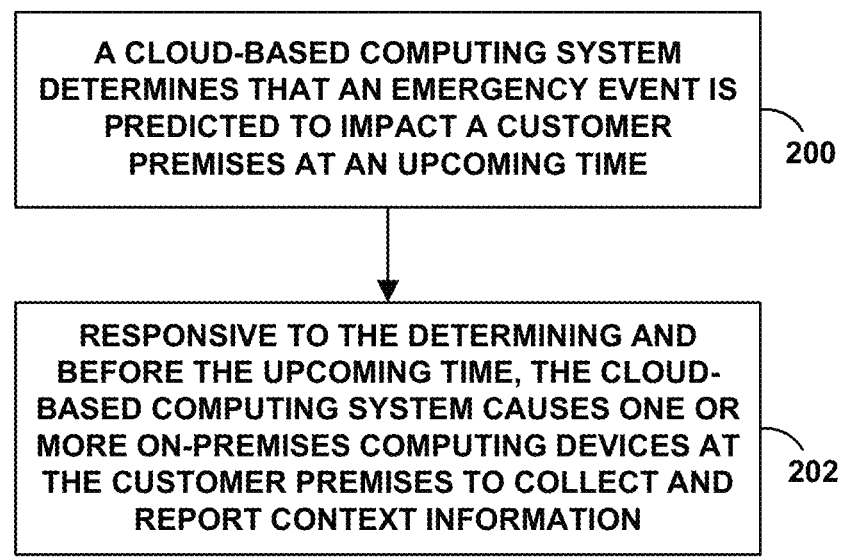
FIG. 2 is a flow chart depicting an example method that can be carried out in accordance with the disclosure.
Figure 3:
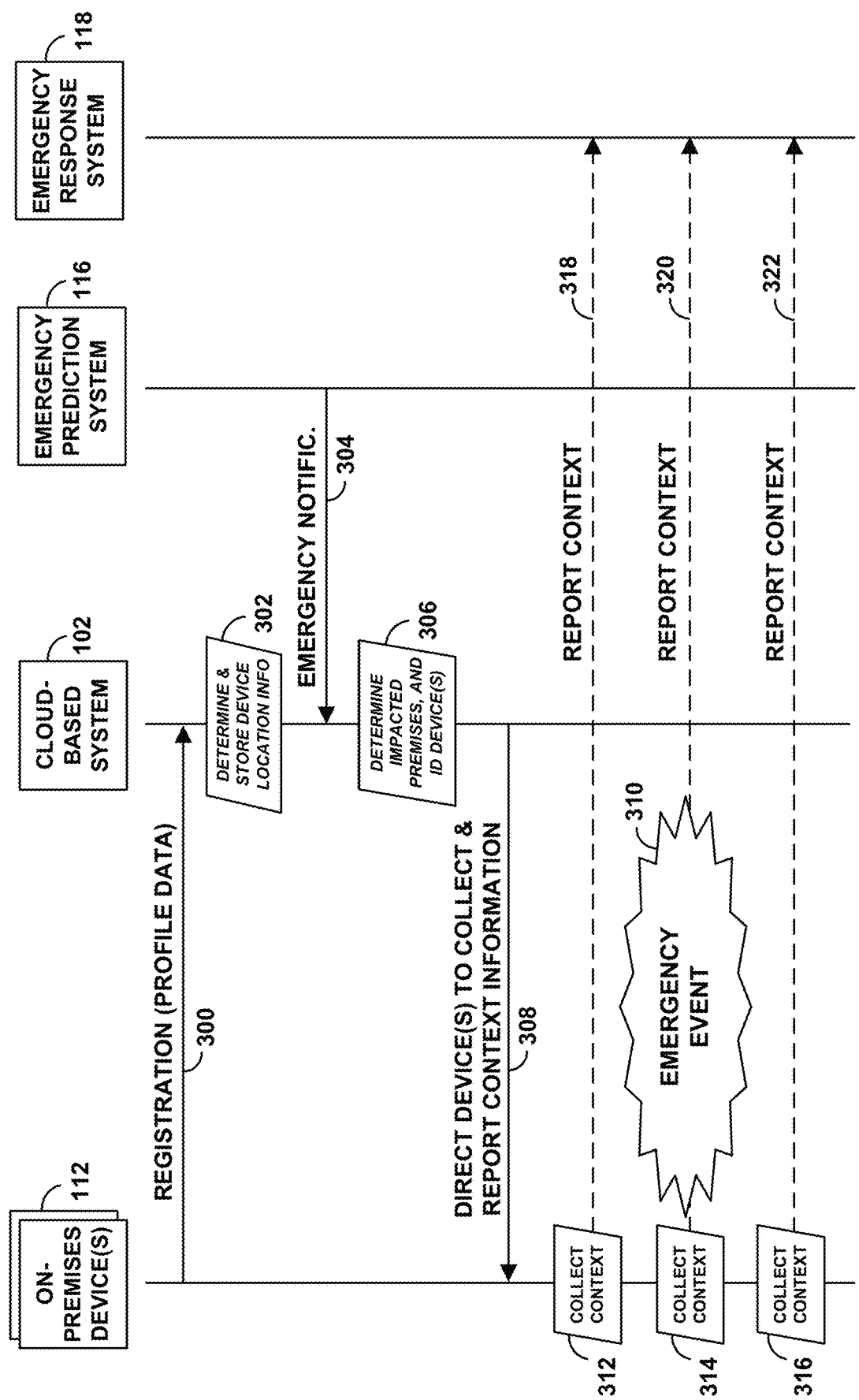
FIG. 3 is a message flow diagram depicting an example method that can be carried out in accordance with the disclosure.

FIG. 2 is next a flow chart depicting an example method that could be carried out in accordance with the present disclosure. As shown in FIG. 3, at block 200, the method could include a cloud-based computing system determining that an emergency event is predicted to impact a customer premises at an upcoming time. And at block 202, the method could include, responsive to the determining and before the upcoming time, the cloud-based computing system causing one or more on-premises computing devices at the customer premises to collect and report context information. For instance, as discussed above, the causing of the one or more on-premises computing devices at the customer premises to collect and report context information could involve transmitting from the cloud-based computing system to the one or more on-premises computing devices one or more messages interpretable by the one or more on-premises computing devices to cause the one or more on-premises computing devices to collect and report the context information.

In line with the discussion above, the emergency event could comprise a weather and/or natural-disaster event. Further, the context information could comprise information such as a number of people present at the customer premises and/or an operational status of one or more utilities or other systems at the customer premises.

In addition, as discussed above, the act of the cloud-based computing system determining that the emergency event is predicted to impact the customer premises at the upcoming time could involve the cloud-based computing system receiving from an emergency-prediction system a notification that the emergency event is predicted to occur at a location, and the cloud-based computing system determining that the location where the emergency event is predicted to occur corresponds with a location of the customer premises.

Further, the method could involve the cloud-based computing system receiving, from at least one of the one or more on-premises computing devices at the customer premises, information indicating the location of the customer premises. And in that case, the act of determining by the cloud-based computing system that the location where the emergency event is predicted to occur corresponds with a location of the customer premises could involve the cloud-based computing system comparing the location where the emergency event is predicted to occur with the indicated location of the customer premises and thereby determining that the location of where the emergency event is predicted to occur overlaps with or is within a predefined short distance of the indicated location of the customer premises.

As further discussed above, the act of the cloud-based computing system causing one or more on-premises computing devices at the customer premises to collect and report context information could involve specifying in the one or more messages one or more times when the at least one on-premises computing device is to collect the context information, with each of the one or more times being defined in relation to the upcoming time when the emergency event is predicted to occur. Thus, in an example implementation, the context information could include context information as of before the predicted emergency event impacts the customer premises and context information as of after the predicted emergency event impacts the customer premises, among other possibilities.

In addition, as discussed above, the act of the cloud-based computing system causing one or more on-premises computing devices at the customer premises to collect and report context information could involve providing at least one of the one or more on-premises computing devices with a set of program logic executable by the at least one on-premises computing device to cause the at least one on-premises computing device to collect and report the context information.

Further, as discussed above, where there are multiple on-premises computing devices at the customer premises, the method could additionally involve the cloud-based computing system selecting a given one of the multiple on-premises computing devices to be a coordinating device (e.g., with the selecting being based on capabilities data of the given device), and the cloud-based computing system causing that selected device to coordinate the collecting and reporting of the context information. For instance, the cloud-based computing system could provide the selected device with an indication of one or more other on-premises computing devices at the customer premises, to enable the selected device to engage in signaling with each other indicated on-premises computing device to obtain context information collected by the indicated on-premises computing device.

FIG. 3 is next a message flow diagram depicting an example method that could be carried out in accordance with the present disclosure. FIG. 3 depicts at its top various entities that could participate in the method in line with the discussion above. Namely, the figure depicts one or more on-premises computing devices 112 (at particular customer premises), the cloud-based computing system 102, the emergency-prediction system 116, and the emergency response system 118.

As shown in FIG. 3, at step 300, the one or more on-premises computing devices 112 register with the cloud-based computing system 102. As discussed above, for instance, each on-premises computing device 112 may transmit a registration message to the cloud-based computing system 102, providing the cloud-based computing system with profile data such as capabilities data, a local IP address, and a unique hardware address, among other possibilities. Upon receipt of this registration message, the cloud-based computing system 102 may then store the profile data as noted above. Further, at step 302, the cloud-based computing system 102 may determine the location (e.g., street address) of each such on-premises computing device 112 and may determine that multiple such registered on-premises computing devices 112 are located at a common geographic location, such as at a common customer premises, and the cloud-based computing system 102 may store the device location information for later reference.

At step 304, the cloud-based computing system 102 may then receive from the emergency prediction system 116 a notification of a predicted emergency event along with an indication of location and time of the predicted emergency. For instance, as noted above, the cloud-based computing system 102 may have subscribed to be notified by the emergency prediction system 116 of such predicted emergencies, and the emergency prediction system 116 may therefore notify the cloud-based computing system based on that subscription.

At step 306, the cloud-based computing system may then determine what customer premises will be impacted by the predicted emergency event and identify one or more on-premises computing devices 112 at that customer premises. For instance, as discussed above, the cloud-based computing system may compare the location of the predicted emergency event with the locations of various customer premises having one or more registered on-premises computing devices 112 and may determine based on that comparison that the location of given customer premises corresponds with the location of the predicted emergency event.

At step 308, the cloud-based computing system 102 may then send one or more messages to the identified one or more on-premises computing devices 112 at the determined customer premises, to cause the one or more on-premises computing devices 112 to collect and report context information. For instance, as noted above, the cloud-based computing system 102 may reach out to individual such devices 112 to cause them to do so and/or may select a device 112 to be a coordinating device and may reach out to the selected coordinating device to cause it to coordinate the process. Optimally as discussed above, the cloud-based computing system 102 could send one or more such directives to the on-premises computing devices before the time of the predicted emergency event 310.

In response, the one or more on-premises computing devices 112 may then collect context information (e.g., whether one or more people are present, and/or the status of one or more utility monitors or the like) and report the collected context information to the emergency response system 118. As noted above, this collecting and reporting of context information could occur at various times in relation to the predicted emergency event 310. For instance, at step 312, the device(s) could collect some such context information before the time of the predicted emergency event 310, at step 314, the device(s) could collect some such context information at the time of the predicted emergency event 310, and/or at step 320, the device(s) could collect some such context information after the time of the predicted emergency event, timestamping the various collected information. Further, at step 318, the device(s) could report any context information collected as of before the time of the predicted emergency event 310, at step 320, the device(s) could report (e.g., incrementally) any context information collected as of the time of the predicted emergency event 310, and at step 322, the device(s) could report (e.g., incrementally), any context information collected as of after the time of the predicted emergency event 310.

Accordingly, in line with the discussion above, the cloud-based computing system 102 could request one or more on-premises computing devices 112 at representative customer premises 100 to collect and report context information in view of a prediction that the emergency event will impact the customer premises 100.

As noted above, this prediction could be based on information from the emergency-prediction system 116 establishing that the emergency event is predicted to occur at a location of the customer premises 100. In addition, as noted above, the prediction that the customer premises 100 will be impacted by the emergency event could involve use of crowdsourcing to predict that the customer premises will be so impacted.

By way of example, if the emergency-prediction system 116 provides notification that an emergency event will occur in a given location area, such as a given city, campus, or zip-code area, the cloud-based computing system 102 could then use crowdsourcing to detect that the emergency event is causing impact along a trajectory headed toward the customer premises and thus to predict that the customer premises 100 within that location area will be impacted by the emergency event.

Figure 4:
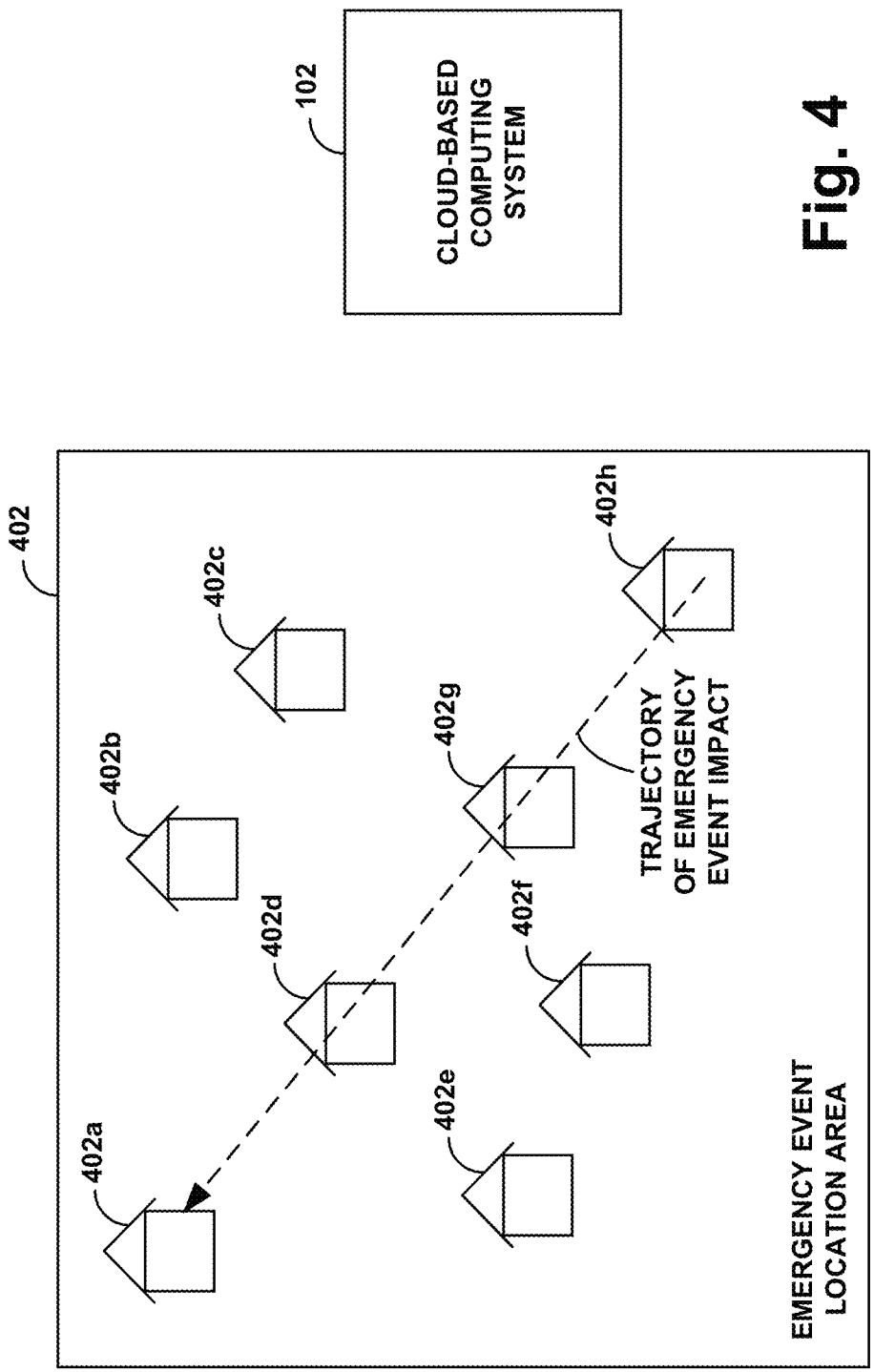
FIG. 4 is a simplified block diagram illustrating an example arrangement including multiple customer premises, with emergency event impact progressing along a trajectory from customer premises to customer premises.

FIG. 4 illustrates an example such scenario. As shown in FIG. 4, a representative location area 400 where the emergency event is predicted to occur includes multiple customer premises 402*a-i*, each of which may contain one or more on-premises computing devices registered and in communication with the cloud-based computing system 102 as discussed above. As such, the cloud-based computing system 102 may have access to information indicating the geographic location respectively of each such customer premises 402.

Once the cloud-based computing system 102 receives notification indicating that an emergency event is predicted to occur in location area 400, the cloud-based computing system 102 may then responsively start monitoring for impact of the emergency event at the various customer premises 402 in that area. One form of impact that the cloud-based computing system 102 could monitor for is loss of WAN connectivity with the customer premises, which might be a result of the emergency event. The cloud-based computing system 102 could detect loss of WAN connectivity with any given customer premises 402 by detecting absence of expected heartbeat messages or the like from one or more on-premises computing devices 112 at the customer premises.

Through this monitoring, the cloud-based computing system 102 may thereby detect a progressive loss of WAN connectivity of multiple customer premises 402 along a trajectory leading toward given customer premises. For instance, as shown by the dashed arrow in FIG. 4, the cloud-based computing system 102 may detect loss of WAN connectivity progressively at customer premises 402*h*, then customer premises 402*g*, and then customer premises 402*d*. Considering the geographic trajectory of these losses, the cloud-based computing system 102 could therefore predict that customer premises 402*a* will soon lose its WAN connectivity too, as a possible impact of the emergency event. And in response to this prediction that customer premises 402*a* will be so impacted by the emergency event, optimally before that impact occurs, the cloud-based computing system 102 could then proceed as noted above to cause one or more on-premises computing devices 112 at that customer premises 402*a* to collect and report context information.

Note also that other forms of emergency-event impact and monitoring for progressive impact could be possible as well, possibly depending on the type of emergency. For example, if the emergency is an earthquake, one way to detect that impact of the emergency at each of various customer premises could be for one or more vibration sensor at the customer premises to detect strong vibration and to report that detected vibration to the cloud-based computing system 102. As another example, if the emergency is a flood, one way to detect the impact of the emergency at each of various customer premises could be for one or more water sensors at the customer premises to detect water and to report that detected water to the cloud-based computing system 102. As yet another example, if the emergency is a fire, one way to detect the fire could be for one or more smoke or heat sensors at the customer premises to detect smoke or heat and to report the detected smoke or heat to the cloud-based computing system 102. Other examples could be possible as well.

Figure 5:
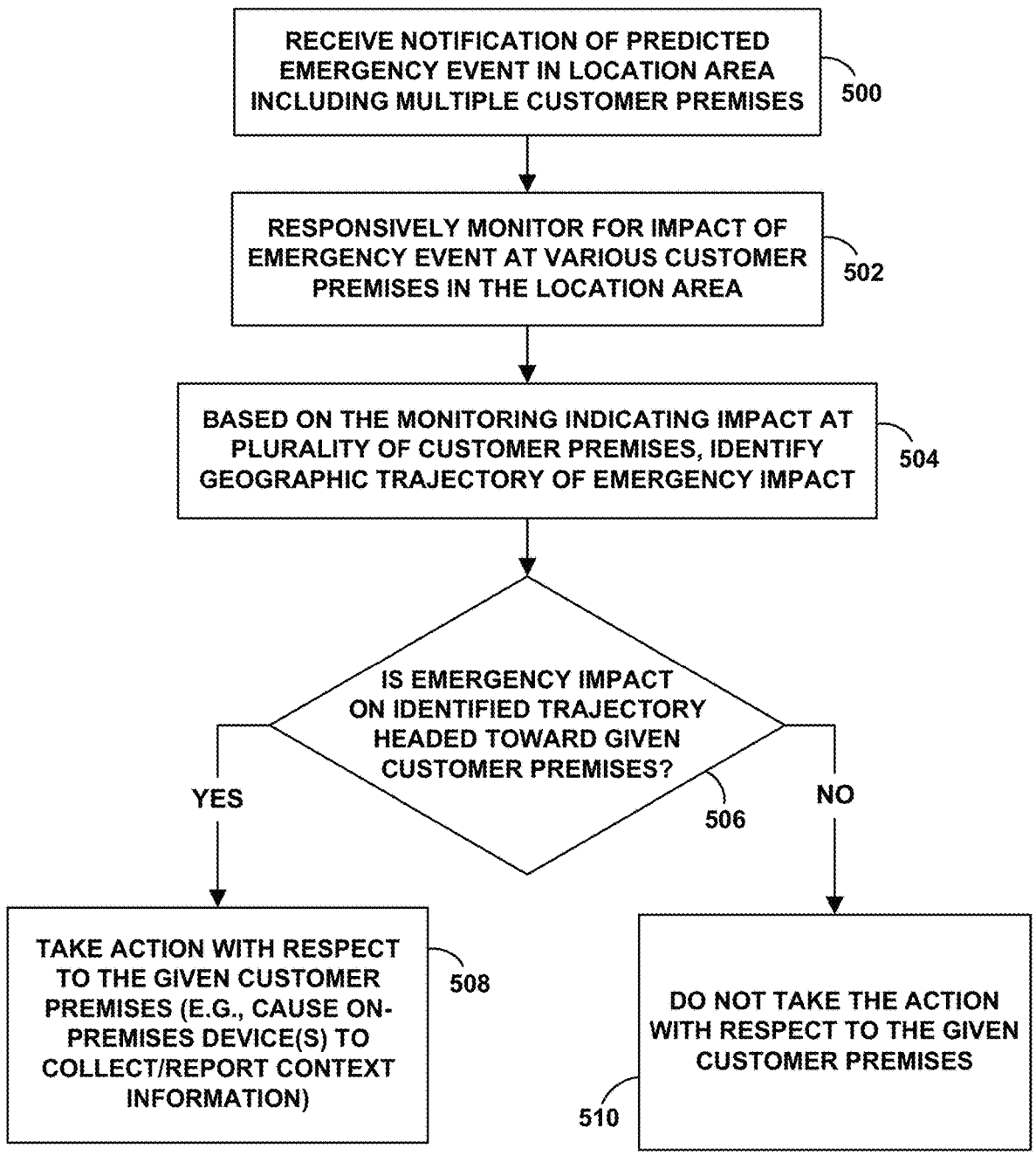
FIG. 5 is a flow chart depicting an example method that can be carried out in accordance with the disclosure.

FIG. 5 is next a flow chart depicting an example method that could be carried out accordingly, making use of crowdsourcing. As shown in FIG. 5, at block 500, a computing system could receive a notification of a predicted emergency event in a location area that includes multiple customer premises. At block 502, the computing system could then responsively monitor for impact of the emergency event at various customer premises in the location area. At block 504, based on that monitoring indicating impact at multiple customer premises, the computing system could identify a geographic trajectory of the emergency impact.

At block 506, as to each of various customer premises, the computing system could determine whether the emergency impact on the identified trajectory is headed toward the customer premises. If the computing system determines that the emergency impact on the identified trajectory is headed toward given customer premises (e.g., first customer premises), then, at block 508, the computing system could responsively take action with respect to that customer premises, such as causing one or more devices at the customer premises to collect and report context information. Whereas, if the computing system determines that the emergency impact on the identified trajectory is not headed toward given customer premises (e.g., second customer premises), then, at block 510, the computing system could forgo from taking the action with respect to that customer premises.

While the above discussion has focused on implementation where customer premises communicate with the cloud-based computing system via a WAN such as the internet for instance, that the features described could apply in other scenarios as well. For instance, in a hotel, campus, metropolis, or the like that encompasses various customer premises such as rooms, floors, buildings, or the like, and that has a LAN or other network that serves each of those customer premises, a cloud-based computing system like that described above could be provided on that LAN to serve the on-premises computing devices in each such customer premises.

By way of example, a hotel having many guest rooms that each contain one or more on-premises computing devices may also implement a cloud-based computing system as described above. The hotel's cloud-based computing system may then learn of an emergency event that is predicted to impact one or more such customer premises at an upcoming time and, in response to that prediction, may signal to one or more on-premises computing devices in a given such customer premises to cause the device(s) to collect and report context information, which may assist in responding to the emergency event.

The context information collected and reported as described herein may enable first responders and/or other emergency-response personnel to take appropriate action to assist in responding to the emergency event. For example, information indicating the number of people actively present at the impacted customer premises before, during, and/or after the predicted time of the emergency event may enable response personnel to rescue or otherwise assist the one or more people present. As another example, information indicating the state of one or more utilities or other systems at the customer premises before, during, and/or after the predicted time of the emergency event may enable response personnel to dispatch service to repair or otherwise address those systems.

As noted above, one or more on-premises computing devices may report this context information to the cloud-based computing system or to another designated address such as an address of an emergency response system 118. To the extent one or more on-premises computing devices report such information to the cloud-based computing system, the cloud-based computing system could then in turn forward that information along to the emergency-response system 118 to help facilitate response to the emergency event.

Note also that, in addition to causing one or more on-premises computing devices 112 to collect and report context information in view of a predicted emergency event, or as an alternative to doing so, the cloud-based computing system 102 could cause one or more on-premises computing devices 112 to take one or more other useful actions in view of the predicted emergency event. For instance, the cloud-based computing system 102 could send to the one or more on-premises computing devices 112 a list of actions that the one or more on-premises computing devices 112 should carry out possibly in addition to reporting and collecting context information, and the one or more on-premises computing devices 112 could responsively carry out the listed actions. Examples of such actions could include sounding a siren and/or other audible alert, turning on and possibly flashing a light and/or other visual alert, recording video and/or audio, and transmitting one or more emergency-alert messages, among other possibilities.

Figure 6:
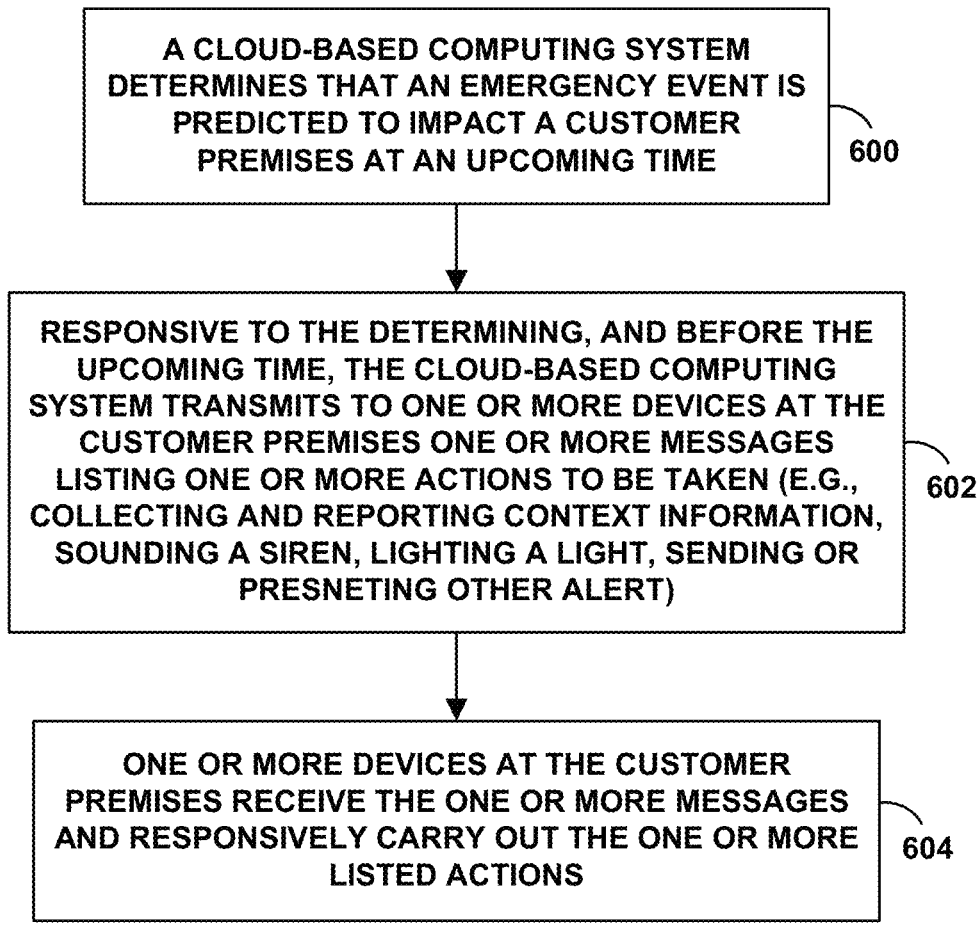
FIG. 6 is a flow chart depicting an example method that can be carried out in accordance with the disclosure.

FIG. 6 illustrates an example method that could be carried out accordingly. As shown in FIG. 6, at block 600, a cloud-based computing system could determine that an emergency event is predicted to impact customer premises at an upcoming time. At block 602, responsive to the that determination, and before the upcoming time, the cloud-based computing system could transmit to one or more devices at the customer premises one or more messages listing one or more actions to be taken, such as collecting and reporting context information, sounding a siren, lighting a light, and/or sending or presenting another other alert, among other possibilities). And at block 604, one or more devices at the customer premises could receive the one or more messages and responsively carry out the one or more listed actions.

Figure 7:
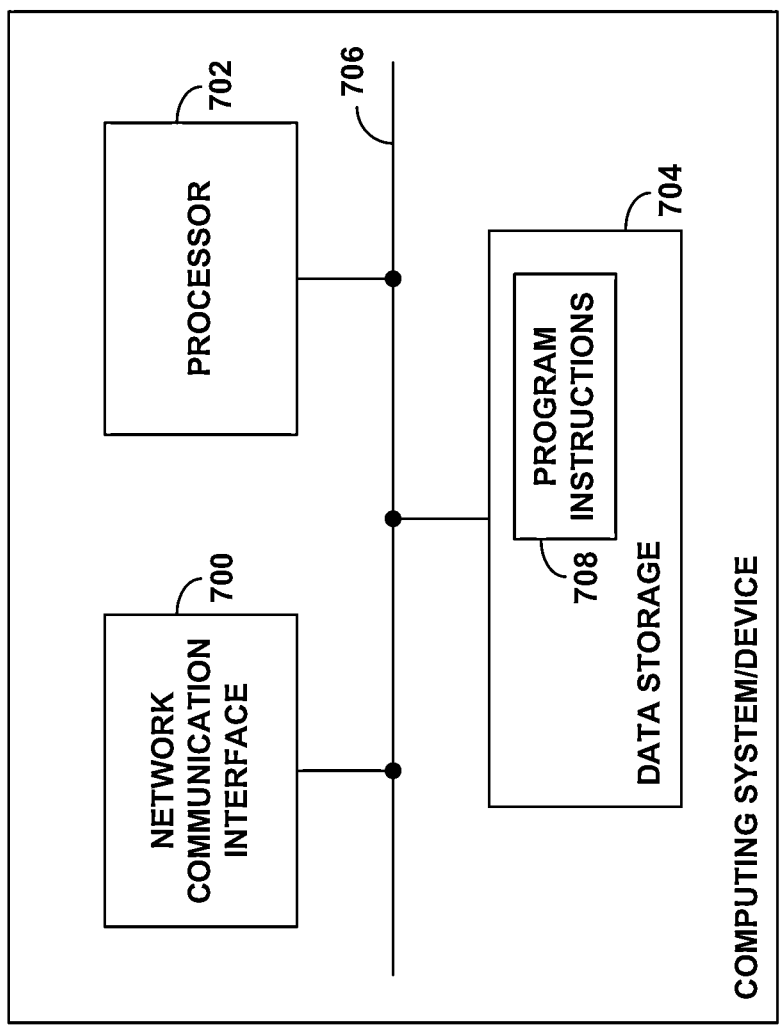
FIG. 7 is a simplified block diagram of a computing system or device operable in accordance with the disclosure.

FIG. 7 is next a simplified block diagram illustrating components of a computing system or device operable in the processes described above. The example arrangement shown in FIG. 7 could represent the cloud-based computing system or an on-premises computing device, among other possibilities. As shown in FIG. 7, the example arrangement includes a network communication interface 700, a processor 702, and non-transitory data storage 704, communicatively linked together by a system bus or other connection mechanism 706. Further, the example arrangement may include other components. For instance, various on-premises computing devices may include sensors such as cameras, microphones, motion sensors, among other possibilities, to facilitate collecting of context information.

Network communication interface 700 could comprise one or more wired and/or wireless network communication modules along with associated drivers and/or other logic, to enable communication over a network such as a LAN or WAN. Processor 702 could comprise one or more general purpose processors (e.g., microprocessors) and/or one or more special-purpose processors (e.g., application specific integrated circuits or digital signal processors). And non-transitory data storage 704 could comprise one or more volatile and/or non-volatile storage components such as magnetic, optical, or flash storage, among other possibilities. As further shown, data storage 704 could hold program instructions 708, which could be executable by the processor 702 to carry out various operations described herein.

Further, the present disclosure also contemplates one or more non-transitory computer-readable media encoded with, embodying, or otherwise storing program instructions executable by a processor (e.g., one or more processors) to carry out various operations as described herein.

Exemplary embodiments have been described above. Those skilled in the art will understand, however, that changes and modifications may be made to these embodiments without departing from the true scope and spirit of the invention.

What is claimed is:

1. A method comprising:
    determining by a cloud-based computing system that an emergency event is predicted to impact a customer premises at an upcoming time; and
    responsive to the determining and before the upcoming time, causing by the cloud-based computing system one or more on-premises computing devices at the customer premises to collect and report context information, wherein causing the one or more on-premises computing devices at the customer premises to collect and report context information comprises (i) transmitting from the cloud-based computing system to the one or more on-premises computing devices one or more messages interpretable by the one or more on-premises computing devices to cause the one or more on-premises computing devices to collect and report the context information and (ii) including in the one or more messages to at least one of the one or more on-premises computing devices a set of program logic executable by the at least one on-premises computing device to cause the at least one on-premises computing device to collect and report the context information.

2. The method of claim 1, wherein the emergency event comprises a weather and/or natural-disaster event.

3. The method of claim 1, wherein the context information comprises information selected from the group consisting of (i) a number of people present at the customer premises and (ii) an operational status of one or more utilities or other systems at the customer premises.

4. The method of claim 1, wherein determining by the cloud-based computing system that the emergency event is predicted to impact the customer premises at the upcoming time comprises:
    receiving by the cloud-based computing system from an emergency-prediction system a notification that the emergency event is predicted to occur at a location; and determining by the cloud-based computing system that the location where the emergency event is predicted to occur corresponds with a location of the customer premises.

5. The method of claim 4, further comprising receiving by the cloud-based computing system, from at least one of the one or more on-premises computing devices at the customer premises, information indicating the location of the customer premises,
   wherein determining by the cloud-based computing system that the location where the emergency event is predicted to occur corresponds with a location of the customer premises comprises comparing by the cloud-based computing system the location where the emergency event is predicted to occur with the indicated location of the customer premises and thereby determining that the location of where the emergency event is predicted to occur overlaps with or is within a predefined short distance of the indicated location of the customer premises.

6. The method of claim 1, wherein causing by the cloud-based computing system one or more on-premises computing devices at the customer premises to collect and report context information comprises specifying in the one or more messages one or more times when the one or more on-premises computing devices should collect the context information,
   wherein each of the one or more times is defined in relation to the upcoming time when the emergency event is predicted to occur.

7. The method of claim 6, wherein the context information comprises context information as of before the predicted emergency event impacts the customer premises and context information as of after the predicted emergency event impacts the customer premises.

8. The method of claim 1, wherein there are multiple on-premises computing devices at the customer premises, the method further comprising:
   selecting by the cloud-based computing system a given one of the multiple on-premises computing devices to be a coordinating device, and causing by the cloud-based computing system the selected device to coordinate the collecting and reporting of the context information, wherein selecting the given device to be the coordinating device is based on capabilities data of the given device,
   wherein causing by the cloud-based computing system the selected device to coordinate the collecting and reporting of the context information comprises providing the selected device with an indication of one or more other on-premises computing devices at the customer premises, to enable the selected device to engage in signaling with each other indicated on-premises computing device to obtain context information collected by the indicated on-premises computing device.

9. A computing system comprising:
   a network communication interface;
   a processor;
   non-transitory data storage; and
   program instructions stored in the non-transitory data storage and executable by the processor to carry out operations comprising:
      determining that an emergency event is predicted to impact a customer premises at an upcoming time, and
      responsive to the determining and before the upcoming time, causing one or more on-premises computing devices at the customer premises to collect and report context information, wherein causing the one or more on-premises computing devices at the customer premises to collect and report context information comprises (i) transmitting through the network communication interface to the one or more on-premises computing devices one or more messages interpretable by the one or more on-premises computing devices to cause the one or more on-premises computing devices to collect and report the context information and (ii) including in the one or more messages to at least one of the one or more on-premises computing devices a set of program logic executable by the at least one on-premises computing device to cause the at least one on-premises computing device to collect and report the context information.

10. The computing system of claim 9, wherein the computing system is cloud-based and located remotely from the customer premises.

11. The computing system of claim 9, wherein the emergency event comprises a weather and/or natural-disaster event.

12. The computing system of claim 9, wherein the context information comprises information selected from the group consisting of (i) a number of people present at the customer premises and (ii) an operational status of one or more utilities or other systems at the customer premises.

13. The computing system of claim 9, wherein determining that the emergency event is predicted to impact the customer premises at the upcoming time comprises:
   receiving from an emergency-prediction system a notification that the emergency event is predicted to occur at a location; and
   determining that the location where the emergency event is predicted to occur corresponds with a location of the customer premises.

14. The computing system of claim 9, wherein causing the one or more on-premises computing devices at the customer premises to collect and report context information comprises specifying in the one or more messages one or more times when the one or more one on-premises computing devices should collect the context information,
   wherein each of the one or more times is defined in relation to the upcoming time when the emergency event is predicted to occur.

15. The computing system of claim 14, wherein the context information comprises context information as of before the predicted emergency event impacts the customer premises and context information as of after the predicted emergency event impacts the customer premises.

16. The computing system of claim 9, wherein there are multiple on-premises computing devices at the customer premises, the operations further comprising:
   selecting a given one of the multiple on-premises computing devices to be a coordinating device, and causing the selected device to coordinate the collecting and reporting of the context information, wherein selecting the given device to be the coordinating device is based on capabilities data of the given device,
   wherein causing the selected device to coordinate the collecting and reporting of the context information comprises providing the selected device with an indication of one or more other on-premises computing devices at the customer premises, to enable the selected device to engage in signaling respectively with each other indicated on-premises computing device to obtain context information collected by the indicated on-premises computing device.

17. A non-transitory computer-readable medium having stored thereon program instructions executable by a processor to carry out operations comprising:
   determining that an emergency event is predicted to impact a customer premises at an upcoming time; and
   responsive to the determining and before the upcoming time, causing one or more on-premises computing devices at the customer premises to collect and report context information, wherein causing the one or more on-premises computing devices at the customer premises to collect and report context information comprises (i) transmitting to the one or more on-premises computing devices one or more messages interpretable by the one or more on-premises computing devices to cause the one or more on-premises computing devices to collect and report the context information and (ii) including in the one or more messages to at least one of the one or more on-premises computing devices a set of program logic executable by the at least one on-premises computing device to cause the at least one on-premises computing device to collect and report the context information.

18. The non-transitory computer-readable medium of claim 17, wherein the emergency event comprises a weather and/or natural-disaster event, and wherein the context information comprises information selected from the group consisting of (i) a number of people present at the customer premises and (ii) an operational status of one or more utilities or other systems at the customer premises.

19. The non-transitory computer-readable medium of claim 17, wherein causing by the one or more on-premises computing devices at the customer premises to collect and report context information comprises specifying in the one or more messages one or more times when the one or more on-premises computing devices should collect the context information,
   wherein each of the one or more times is defined in relation to the upcoming time when the emergency event is predicted to occur, and
   wherein the context information comprises context information as of before the predicted emergency event impacts the customer premises and context information as of after the predicted emergency event impacts the customer premises.

20. The non-transitory computer-readable medium of claim 17, wherein there are multiple on-premises computing devices at the customer premises, the operations further comprising:
   selecting a given one of the multiple on-premises computing devices to be a coordinating device, and causing the selected device to coordinate the collecting and reporting of the context information,
   wherein selecting the given device to be the coordinating device is based on capabilities data of the given device,
   wherein causing the selected device to coordinate the collecting and reporting of the context information comprises providing the selected device with an indication of one or more other on-premises computing devices at the customer premises, to enable the selected device to engage in signaling with each other indicated on-premises computing device to obtain context information collected by the indicated on-premises computing device.

* * * * *